US012792038B1

(12) United States Patent
Patel et al.

(10) Patent No.: US 12,792,038 B1
(45) Date of Patent: Nov. 10, 2026

(54) SYSTEM AND METHOD FOR AUTONOMOUS WASTE COLLECTION BY A WASTE SERVICES PROVIDER DURING PERFORMANCE OF A WASTE SERVICE ACTIVITY

(71) Applicant: WM Intellectual Property Holdings, L.L.C., Houston, TX (US)

(72) Inventors: Kalpesh Patel, Houston, TX (US); Vu Nguyen, Houston, TX (US); David Tessin, Houston, TX (US); Steven Hamaker, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/655,862

(22) Filed: May 6, 2024

Related U.S. Application Data

(63) Continuation of application No. 18/130,367, filed on Apr. 3, 2023, now Pat. No. 11,977,381.

(Continued)

(51) Int. Cl.
*G05D 1/00* (2024.01)
*B65F 3/02* (2006.01)

(52) U.S. Cl.
CPC ............. *G05D 1/0088* (2013.01); *B65F 3/02* (2013.01); *G05D 1/0027* (2013.01); *B65F 2210/168* (2013.01)

(58) Field of Classification Search
CPC ...... G05D 1/0088; G05D 1/0027; B65F 3/02; B65F 2201/168

(Continued)

(56) References Cited

U.S. PATENT DOCUMENTS 1,112,841 A 10/1914 Rugh
3,202,305 A 8/1965 Herpich (Continued)

FOREIGN PATENT DOCUMENTS

CA 2632738 C 5/2016
CA 2632689 C 10/2016

(Continued)

OTHER PUBLICATIONS

Adedeji, Olugbaja et al.: Intelligent Waste Classification System Using Deep Learning Convolutional Neural Network; 2nd International Conference on Sustainable Materials Processing and Manufacturing; Elsevier B.V.; 2019; pp. 607-612.

(Continued)

*Primary Examiner* — Yazan A Soofi
(74) *Attorney, Agent, or Firm* — Greenberg Traurig LLP

(57) ABSTRACT

Systems and methods for autonomous waste and/or recycling collection by a waste services provider during performance of a waste service activity are provided. In a waste services environment, a waste service vehicle is configured to provide services to customers. The system and method can include, without limitation: a collection station or "hub" at a centralized location in a residential neighborhood; a plurality of autonomous collection vehicles capable of traveling between the collection station and the residences in the neighborhood to collect waste/items and/or containers at the residences and deliver the waste/items and/or containers to the collection station; and a waste service vehicle capable of collecting waste/items from the collection station and transporting the waste/items away from the neighborhood to a landfill or other collection, disposal or processing site.

38 Claims, 5 Drawing Sheets

Related U.S. Application Data

(60) Provisional application No. 63/326,708, filed on Apr. 1, 2022.

(58) Field of Classification Search
USPC .......................................................... 701/23
See application file for complete search history.

(56) References Cited

U.S. PATENT DOCUMENTS

| | | | |
|---|---|---|---|
| 5,072,833 | A | 12/1991 | Hansen |
| 5,230,393 | A | 7/1993 | Mezey |
| 5,245,137 | A | 9/1993 | Bowman |
| 5,278,914 | A | 1/1994 | Kinoshita |
| 5,489,898 | A | 2/1996 | Shigekusa |
| 5,565,846 | A | 10/1996 | Geiszler et al. |
| 5,762,461 | A | 6/1998 | Frohlingsdorf |
| 5,837,945 | A | 11/1998 | Cornwell et al. |
| 6,097,995 | A | 8/2000 | Tipton |
| 6,408,261 | B1 | 6/2002 | Durbin |
| 6,448,898 | B1 | 9/2002 | Kasik |
| 6,510,376 | B2 | 1/2003 | Burnstein |
| 6,563,433 | B2 | 5/2003 | Fujiwara |
| 6,729,540 | B2 | 5/2004 | Ogawa |
| 6,811,030 | B1 | 11/2004 | Compton |
| 7,146,294 | B1 | 12/2006 | Waitkus, Jr. |
| 7,330,128 | B1 | 2/2008 | Lombardo |
| 7,383,195 | B2 | 6/2008 | Mallett |
| 7,406,402 | B1 | 7/2008 | Waitkus, Jr. |
| 7,501,951 | B2 | 3/2009 | Maruca |
| 7,511,611 | B2 | 3/2009 | Sabino |
| 7,536,457 | B2 | 5/2009 | Miller |
| 7,659,827 | B2 | 2/2010 | Gunderson |
| 7,804,426 | B2 | 9/2010 | Etcheson |
| 7,817,021 | B2 | 10/2010 | Date |
| 7,870,042 | B2 | 1/2011 | Maruca |
| 7,878,392 | B2 | 2/2011 | Mayers |
| 7,957,937 | B2 | 6/2011 | Waitkus, Jr. |
| 7,994,909 | B2 | 8/2011 | Maruca |
| 7,999,688 | B2 | 8/2011 | Healey |
| 8,020,767 | B2 | 9/2011 | Reeves |
| 8,056,817 | B2 | 11/2011 | Flood |
| 8,146,798 | B2 | 4/2012 | Flood |
| 8,185,277 | B2 | 5/2012 | Flood |
| 8,269,617 | B2 | 9/2012 | Cook |
| 8,314,708 | B2 | 11/2012 | Gunderson |
| 8,330,059 | B2 | 12/2012 | Curotto |
| 8,332,247 | B1 | 12/2012 | Bailey |
| 8,373,567 | B2 | 2/2013 | Denson |
| 8,374,746 | B2 | 2/2013 | Plante |
| 8,384,540 | B2 | 2/2013 | Reyes |
| 8,417,632 | B2 | 4/2013 | Robohm |
| 8,433,617 | B2 | 4/2013 | Goad |
| 8,485,301 | B2 | 7/2013 | Grubaugh et al. |
| 8,508,353 | B2 | 8/2013 | Cook |
| 8,542,121 | B2 | 9/2013 | Maruca |
| 8,550,252 | B2 | 10/2013 | Borowski |
| 8,564,426 | B2 | 10/2013 | Cook |
| 8,564,446 | B2 | 10/2013 | Gunderson |
| 8,602,298 | B2 | 12/2013 | Gonen |
| 8,606,492 | B1 | 12/2013 | Botnen |
| 8,630,773 | B2 | 1/2014 | Lee et al. |
| 8,645,189 | B2 | 2/2014 | Lyle |
| 8,674,243 | B2 | 3/2014 | Curotto |
| 8,676,428 | B2 | 3/2014 | Richardson |
| 8,714,440 | B2 | 5/2014 | Flood |
| 8,738,423 | B2 | 5/2014 | Lyle |
| 8,744,642 | B2 | 6/2014 | Nemat-Nasser |
| 8,803,695 | B2 | 8/2014 | Denson |
| 8,818,908 | B2 | 8/2014 | Altice |
| 8,849,501 | B2 | 9/2014 | Cook |
| 8,854,199 | B2 | 10/2014 | Cook |
| 8,862,495 | B2 | 10/2014 | Ritter |
| 8,880,279 | B2 | 11/2014 | Plante |
| 8,930,072 | B1 | 1/2015 | Lambert |
| 8,952,819 | B2 | 2/2015 | Nemat-Nasser |
| 8,970,703 | B1 | 3/2015 | Thomas, II |
| 8,996,234 | B1 | 3/2015 | Tamari |
| 9,047,721 | B1 | 6/2015 | Botnen |
| 9,058,706 | B2 | 6/2015 | Cheng |
| 9,098,884 | B2 | 8/2015 | Borowski |
| 9,098,956 | B2 | 8/2015 | Lambert |
| 9,111,453 | B1 | 8/2015 | Alselimi |
| 9,158,962 | B1 | 10/2015 | Nemat-Nasser |
| 9,180,887 | B2 | 11/2015 | Nemat-Nasser |
| 9,189,899 | B2 | 11/2015 | Cook |
| 9,226,004 | B1 | 12/2015 | Plante |
| 9,235,750 | B1 | 1/2016 | Sutton |
| 9,238,467 | B1 | 1/2016 | Hoye |
| 9,240,079 | B2 | 1/2016 | Lambert |
| 9,240,080 | B2 | 1/2016 | Lambert |
| 9,245,391 | B2 | 1/2016 | Cook |
| 9,247,040 | B1 | 1/2016 | Sutton |
| 9,251,388 | B2 | 2/2016 | Flood |
| 9,268,741 | B1 | 2/2016 | Lambert |
| 9,275,090 | B2 | 3/2016 | Denson |
| 9,280,857 | B2 | 3/2016 | Lambert |
| 9,292,980 | B2 | 3/2016 | Cook |
| 9,298,575 | B2 | 3/2016 | Tamari |
| 9,317,980 | B2 | 4/2016 | Cook |
| 9,330,287 | B2 | 5/2016 | Graczyk |
| 9,341,487 | B2 | 5/2016 | Bonhomme |
| 9,342,884 | B2 | 5/2016 | Mask |
| 9,344,683 | B1 | 5/2016 | Nemat-Nasser |
| 9,347,818 | B2 | 5/2016 | Curotto |
| 9,358,926 | B2 | 6/2016 | Lambert |
| 9,373,257 | B2 | 6/2016 | Bonhomme |
| 9,389,147 | B1 | 7/2016 | Lambert |
| 9,390,568 | B2 | 7/2016 | Nemat-Nasser |
| 9,396,453 | B2 | 7/2016 | Hynes |
| 9,401,985 | B2 | 7/2016 | Sutton |
| 9,403,278 | B1 | 8/2016 | Van Kampen |
| 9,405,992 | B2 | 8/2016 | Bådholm et al. |
| 9,418,488 | B1 | 8/2016 | Lambert |
| 9,428,195 | B1 | 8/2016 | Surpi |
| 9,442,194 | B2 | 9/2016 | Kurihara |
| 9,463,110 | B2 | 10/2016 | Nishtala |
| 9,466,212 | B1 | 10/2016 | Stumphauzer, II |
| 9,472,083 | B2 | 10/2016 | Nemat-Nasser |
| 9,495,811 | B2 | 11/2016 | Herron |
| 9,501,690 | B2 | 11/2016 | Nemat-Nasser |
| 9,520,046 | B2 | 12/2016 | Call |
| 9,525,967 | B2 | 12/2016 | Mamlyuk |
| 9,546,040 | B2 | 1/2017 | Flood |
| 9,573,601 | B2 | 2/2017 | Hoye |
| 9,574,892 | B2 | 2/2017 | Rodoni |
| 9,586,756 | B2 | 3/2017 | O'Riordan |
| 9,589,393 | B2 | 3/2017 | Botnen |
| 9,594,725 | B1 | 3/2017 | Cook |
| 9,595,191 | B1 | 3/2017 | Surpi |
| 9,597,997 | B2 | 3/2017 | Mitsuta |
| 9,604,648 | B2 | 3/2017 | Tamari |
| 9,633,318 | B2 | 4/2017 | Plante |
| 9,633,576 | B2 | 4/2017 | Reed |
| 9,639,535 | B1 | 5/2017 | Ripley |
| 9,646,651 | B1 | 5/2017 | Richardson |
| 9,650,051 | B2 | 5/2017 | Hoye |
| 9,679,210 | B2 | 6/2017 | Sutton |
| 9,685,098 | B1 | 6/2017 | Kypri |
| 9,688,282 | B2 | 6/2017 | Cook |
| 9,702,113 | B2 | 7/2017 | Kotaki |
| 9,707,595 | B2 | 7/2017 | Ripley |
| 9,721,342 | B2 | 8/2017 | Mask |
| 9,734,717 | B1 | 8/2017 | Surpi |
| 9,754,382 | B1 | 9/2017 | Rodoni |
| 9,766,086 | B1 | 9/2017 | Rodoni |
| 9,778,058 | B2 | 10/2017 | Rodoni |
| 9,803,994 | B1 | 10/2017 | Rodoni |
| 9,824,336 | B2 | 11/2017 | Borges |
| 9,824,337 | B1 | 11/2017 | Rodoni |
| 9,829,892 | B1 | 11/2017 | Rodoni |
| 9,834,375 | B2 | 12/2017 | Jenkins |
| 9,852,405 | B1 | 12/2017 | Rodoni |
| 10,029,685 | B1 | 7/2018 | Hubbard |
| 10,152,737 | B2 | 12/2018 | Lyman |

(56) References Cited

U.S. PATENT DOCUMENTS 10,198,718 B2 2/2019 Rodoni
10,204,324 B2 2/2019 Rodoni
10,210,623 B2 2/2019 Rodoni
10,255,577 B1 4/2019 Steves
10,311,501 B1 6/2019 Rodoni
10,332,197 B2 6/2019 Kekalainen
10,354,232 B2 7/2019 Tomlin, Jr.
10,382,915 B2 8/2019 Rodoni
10,410,183 B2 9/2019 Bostick
10,594,991 B1 3/2020 Skolnick
10,625,934 B2 * 4/2020 Mallady ................ B62B 3/0612
10,628,805 B2 4/2020 Rodatos
10,750,134 B1 8/2020 Skolnick
10,855,958 B1 12/2020 Skolnick
10,911,726 B1 2/2021 Skolnick
11,068,830 B2 7/2021 Rodoni
11,074,557 B2 7/2021 Flood
11,080,628 B2 8/2021 Rodoni
11,128,841 B1 9/2021 Skolnick
11,140,367 B1 10/2021 Skolnick
11,172,171 B1 11/2021 Skolnick
11,222,491 B2 1/2022 Romano
11,315,085 B2 4/2022 Candel et al.
11,340,079 B1 5/2022 Ebrahimi Afrouzi et al.
11,348,269 B1 5/2022 Ebrahimi Afrouzi et al.
11,373,536 B1 6/2022 Savchenko
11,386,362 B1 7/2022 Kim
11,425,340 B1 8/2022 Skolnick
11,475,416 B1 10/2022 Patel
11,475,417 B1 10/2022 Patel
11,488,118 B1 11/2022 Patel
11,616,933 B1 3/2023 Skolnick
11,640,764 B1 5/2023 Alonso Lopez et al.
11,673,740 B2 6/2023 Leon
11,715,150 B2 8/2023 Rodoni
11,727,337 B1 8/2023 Savchenko
11,790,290 B1 10/2023 Kim
11,928,693 B1 3/2024 Savchenko et al.
11,977,381 B1 5/2024 Patel et al.
12,015,880 B1 6/2024 Skolnick
12,136,071 B1 11/2024 Patel et al.
12,266,268 B1 4/2025 Savchenko et al.
12,332,073 B1 6/2025 Savchenko et al.
12,361,432 B1 7/2025 Savchenko et al.
12,373,850 B1 7/2025 Savchenko et al.
12,464,097 B1 11/2025 Skolnick
2002/0069097 A1 6/2002 Conrath
2002/0077875 A1 6/2002 Nadir
2002/0125315 A1 9/2002 Ogawa
2002/0194144 A1 12/2002 Berry
2003/0014334 A1 1/2003 Tsukamoto
2003/0031543 A1 2/2003 Elbrink
2003/0069745 A1 4/2003 Zenko
2003/0191658 A1 10/2003 Rajewski
2003/0233261 A1 12/2003 Kawahara
2004/0039595 A1 2/2004 Berry
2004/0167799 A1 8/2004 Berry
2005/0038572 A1 2/2005 Krupowicz
2005/0080520 A1 4/2005 Kline et al.
2005/0182643 A1 8/2005 Shirvanian
2005/0209825 A1 9/2005 Ogawa
2005/0234911 A1 10/2005 Hess
2005/0261917 A1 11/2005 Forget Shield
2006/0235808 A1 10/2006 Berry
2007/0150138 A1 6/2007 Plante
2007/0260466 A1 11/2007 Casella
2007/0278140 A1 12/2007 Mallett
2008/0010197 A1 1/2008 Scherer
2008/0065324 A1 3/2008 Muramatsu
2008/0077541 A1 3/2008 Scherer
2008/0202357 A1 8/2008 Flood
2008/0234889 A1 9/2008 Sorensen
2009/0014363 A1 1/2009 Gonen
2009/0024479 A1 1/2009 Gonen
2009/0055239 A1 2/2009 Waitkus, Jr.
2009/0083090 A1 3/2009 Rolfes
2009/0126473 A1 5/2009 Porat
2009/0138358 A1 5/2009 Gonen
2009/0157255 A1 6/2009 Plante
2009/0161907 A1 6/2009 Healey
2010/0017276 A1 1/2010 Wolff
2010/0071572 A1 3/2010 Carroll et al.
2010/0119341 A1 5/2010 Flood et al.
2010/0166441 A1 7/2010 Kobayashi
2010/0175556 A1 7/2010 Kummer
2010/0185506 A1 7/2010 Wolff
2010/0217715 A1 8/2010 Lipcon
2010/0312601 A1 12/2010 Lin
2011/0108620 A1 5/2011 Wadden
2011/0116899 A1 5/2011 Dickens
2011/0137776 A1 6/2011 Goad
2011/0208429 A1 8/2011 Zheng
2011/0225098 A1 9/2011 Wolff
2011/0260878 A1 10/2011 Rigling
2011/0279245 A1 11/2011 Hynes
2011/0316689 A1 12/2011 Reyes
2012/0029980 A1 2/2012 Paz
2012/0029985 A1 2/2012 Wilson
2012/0047080 A1 2/2012 Rodatos
2012/0078493 A1 3/2012 Schunder et al.
2012/0262568 A1 10/2012 Ruthenberg
2012/0265589 A1 10/2012 Whittier
2012/0310691 A1 12/2012 Carlsson
2013/0024335 A1 1/2013 Lok
2013/0039728 A1 2/2013 Price
2013/0041832 A1 2/2013 Rodatos
2013/0075468 A1 3/2013 Wadden
2013/0151083 A1 6/2013 Lee et al.
2013/0215270 A1 8/2013 Murashita et al.
2013/0311089 A1 11/2013 Freed et al.
2013/0332238 A1 12/2013 Lyle
2013/0332247 A1 12/2013 Gu
2014/0060939 A1 3/2014 Eppert
2014/0112673 A1 4/2014 Sayama
2014/0114868 A1 4/2014 Wan
2014/0172174 A1 6/2014 Poss et al.
2014/0214697 A1 7/2014 Mcsweeney
2014/0236446 A1 8/2014 Spence
2014/0278630 A1 9/2014 Gates
2014/0379588 A1 12/2014 Gates
2015/0095103 A1 4/2015 Rajamani
2015/0100428 A1 4/2015 Parkinson, Jr.
2015/0144012 A1 5/2015 Frybarger
2015/0178859 A1 6/2015 Takeda
2015/0278759 A1 10/2015 Harris
2015/0294431 A1 10/2015 Fiorucci
2015/0298903 A1 10/2015 Luxford
2015/0302364 A1 10/2015 Calzada
2015/0307273 A1 10/2015 Lyman
2015/0324760 A1 11/2015 Borowski
2015/0326829 A1 11/2015 Kurihara
2015/0348252 A1 12/2015 Mask
2015/0350610 A1 12/2015 Loh
2016/0021287 A1 1/2016 Loh
2016/0044285 A1 2/2016 Gasca
2016/0179065 A1 6/2016 Shahabdeen
2016/0187188 A1 6/2016 Curotto
2016/0224846 A1 8/2016 Cardno
2016/0232498 A1 8/2016 Tomlin, Jr.
2016/0239689 A1 8/2016 Flood
2016/0247058 A1 8/2016 Kreiner
2016/0292653 A1 10/2016 Gonen
2016/0300297 A1 10/2016 Kekalainen
2016/0321619 A1 11/2016 Inan
2016/0334236 A1 11/2016 Mason
2016/0335814 A1 11/2016 Tamari
2016/0355308 A1 12/2016 Poss et al.
2016/0372225 A1 12/2016 Lefkowitz
2016/0377445 A1 12/2016 Rodoni
2016/0379152 A1 12/2016 Rodoni
2016/0379154 A1 12/2016 Rodoni
2017/0008671 A1 1/2017 Whitman et al.
2017/0011363 A1 1/2017 Whitman
2017/0029209 A1 2/2017 Smith

(56) References Cited

U.S. PATENT DOCUMENTS

| | | | | |
|---|---|---|---|---|
| 2017/0046528 | A1 | 2/2017 | Lambert | |
| 2017/0061222 | A1 | 3/2017 | Hoye | |
| 2017/0076249 | A1 | 3/2017 | Byron | |
| 2017/0081120 | A1 | 3/2017 | Liu | |
| 2017/0086230 | A1 | 3/2017 | Azevedo | |
| 2017/0109704 | A1 | 4/2017 | Lettieri | |
| 2017/0116583 | A1 | 4/2017 | Rodoni | |
| 2017/0116668 | A1 | 4/2017 | Rodoni | |
| 2017/0118609 | A1* | 4/2017 | Rodoni | G06Q 50/40 |
| 2017/0121107 | A1 | 5/2017 | Flood | |
| 2017/0124533 | A1 | 5/2017 | Rodoni | |
| 2017/0154287 | A1 | 6/2017 | Kalinowski | |
| 2017/0176986 | A1 | 6/2017 | High | |
| 2017/0193798 | A1 | 7/2017 | Call | |
| 2017/0200333 | A1 | 7/2017 | Plante | |
| 2017/0203706 | A1 | 7/2017 | Reed | |
| 2017/0221017 | A1 | 8/2017 | Gonen | |
| 2017/0243269 | A1 | 8/2017 | Rodini | |
| 2017/0243363 | A1 | 8/2017 | Rodoni | |
| 2017/0277726 | A1 | 9/2017 | Huang | |
| 2017/0308871 | A1 | 10/2017 | Tallis | |
| 2017/0330134 | A1 | 11/2017 | Botea | |
| 2017/0344959 | A1 | 11/2017 | Bostick | |
| 2017/0345169 | A1 | 11/2017 | Rodoni | |
| 2017/0350716 | A1 | 12/2017 | Rodoni | |
| 2017/0355522 | A1 | 12/2017 | Salinas | |
| 2017/0364872 | A1 | 12/2017 | Rodoni | |
| 2018/0012172 | A1 | 1/2018 | Rodoni | |
| 2018/0025329 | A1 | 1/2018 | Podgorny | |
| 2018/0044109 | A1 | 2/2018 | Butcher et al. | |
| 2018/0075417 | A1 | 3/2018 | Gordon | |
| 2018/0087922 | A1 | 3/2018 | Wu et al. | |
| 2018/0158033 | A1 | 6/2018 | Woods | |
| 2018/0194305 | A1 | 7/2018 | Reed | |
| 2018/0224287 | A1 | 8/2018 | Rodini | |
| 2018/0231388 | A1 | 8/2018 | Rodoni | |
| 2018/0245940 | A1 | 8/2018 | Dong | |
| 2018/0247351 | A1 | 8/2018 | Rodoni | |
| 2019/0005466 | A1 | 1/2019 | Rodoni | |
| 2019/0019167 | A1 | 1/2019 | Candel et al. | |
| 2019/0050879 | A1 | 2/2019 | Zhang | |
| 2019/0056416 | A1 | 2/2019 | Rodoni | |
| 2019/0065901 | A1 | 2/2019 | Amato | |
| 2019/0095687 | A1 | 3/2019 | Shaw et al. | |
| 2019/0121368 | A1 | 4/2019 | Bussetti | |
| 2019/0196965 | A1 | 6/2019 | Zhang | |
| 2019/0197498 | A1 | 6/2019 | Gates | |
| 2019/0210798 | A1 | 7/2019 | Schultz | |
| 2019/0217342 | A1 | 7/2019 | Parr et al. | |
| 2019/0244267 | A1 | 8/2019 | Rattner | |
| 2019/0311333 | A1 | 10/2019 | Kekalainen | |
| 2019/0339112 | A1 | 11/2019 | Balachandran et al. | |
| 2019/0360822 | A1 | 11/2019 | Rodoni | |
| 2019/0385384 | A1 | 12/2019 | Romano | |
| 2019/0392403 | A1 | 12/2019 | Rainaldi et al. | |
| 2020/0013024 | A1 | 1/2020 | Armstrong et al. | |
| 2020/0034785 | A1 | 1/2020 | Romano et al. | |
| 2020/0082167 | A1 | 3/2020 | Shalom | |
| 2020/0082354 | A1 | 3/2020 | Kurani | |
| 2020/0109963 | A1 | 4/2020 | Zass | |
| 2020/0164521 | A1 | 5/2020 | Li | |
| 2020/0175556 | A1 | 6/2020 | Podgorny | |
| 2020/0189844 | A1 | 6/2020 | Sridhar | |
| 2020/0191580 | A1 | 6/2020 | Christensen et al. | |
| 2020/0242747 | A1 | 7/2020 | Watanabe | |
| 2020/0248436 | A1 | 8/2020 | Hyodo et al. | |
| 2020/0292348 | A1 | 9/2020 | Chambers et al. | |
| 2020/0327429 | A1 | 10/2020 | Kanamatareddy et al. | |
| 2020/0372498 | A1 | 11/2020 | Chen et al. | |
| 2020/0401995 | A1 | 12/2020 | Aggarwala | |
| 2021/0024068 | A1 | 1/2021 | Lacaze et al. | |
| 2021/0049559 | A1 | 2/2021 | Kilburn | |
| 2021/0060786 | A1 | 3/2021 | Ha | |
| 2021/0081516 | A1 | 3/2021 | Storey | |
| 2021/0114432 | A1 | 4/2021 | Rodoni | |
| 2021/0133697 | A1 | 5/2021 | Flood | |
| 2021/0158308 | A1 | 5/2021 | Armstrong et al. | |
| 2021/0188541 | A1 | 6/2021 | Kurani et al. | |
| 2021/0217156 | A1 | 7/2021 | Balachandran | |
| 2021/0345062 | A1 | 11/2021 | Koga | |
| 2021/0371196 | A1 | 12/2021 | Krishnamurthy | |
| 2022/0026920 | A1 | 1/2022 | Ebrahimi Afrouzi et al. | |
| 2022/0097958 | A1 | 3/2022 | Gargaro et al. | |
| 2022/0118854 | A1 | 4/2022 | Davis et al. | |
| 2022/0324472 | A1 | 10/2022 | Kashu et al. | |
| 2023/0117427 | A1 | 4/2023 | Turner | |
| 2023/0179954 | A1 | 6/2023 | Vassilovski | |
| 2024/0004615 | A1 | 1/2024 | Tao et al. | |

FOREIGN PATENT DOCUMENTS

| | | | |
|---|---|---|---|
| CN | 101482742 | A | 7/2009 |
| CN | 101512720 | A | 8/2009 |
| CN | 105787850 | A | 7/2016 |
| CN | 106296416 | A | 1/2017 |
| CN | 105929778 | B | 10/2018 |
| CN | 209870019 | U | 12/2019 |
| CN | 110751446 | A | 2/2020 |
| CN | 110850959 | A | 2/2020 |
| CN | 110892272 | A | 3/2020 |
| CN | 111241949 | A | 6/2020 |
| CN | 115388873 | A | 11/2022 |
| DE | 69305435 | T2 | 4/1997 |
| DE | 69902531 | T2 | 4/2003 |
| DE | 102012006536 | A1 | 10/2013 |
| EP | 577540 | B1 | 10/1996 |
| EP | 1084069 | B1 | 8/2002 |
| EP | 2028138 | A1 | 2/2009 |
| GB | 2447184 | B | 6/2011 |
| GB | 2508209 | A | 5/2014 |
| JP | 3662616 | B2 | 6/2005 |
| JP | 2012206817 | A | 10/2012 |
| JP | 2013142037 | A | 7/2013 |
| JP | 2021156581 | A | 10/2021 |
| WO | 9954237 | A2 | 10/1999 |
| WO | 2007067772 | A2 | 6/2007 |
| WO | 2007067775 | A2 | 6/2007 |
| WO | 2012069839 | A1 | 5/2012 |
| WO | 2012172395 | A1 | 12/2012 |
| WO | 2016074608 | A2 | 5/2016 |
| WO | 2016187677 | A1 | 12/2016 |
| WO | 2017070228 | A1 | 4/2017 |
| WO | 2017/074716 | A1 | 5/2017 |
| WO | 2017179038 | A1 | 10/2017 |
| WO | 2018182858 | A1 | 10/2018 |
| WO | 2018206766 | A1 | 11/2018 |
| WO | 2018215682 | A1 | 11/2018 |
| WO | 2019/051340 | A1 | 3/2019 |
| WO | 2019/150813 | A1 | 8/2019 |

OTHER PUBLICATIONS

Baldacci, Roberto et al.; The multiple disposal facilities and multiple inventory locations rollon-rolloff vehicle routing problem; Computers & Operations Research 33; 2006; pp. 2667-2702.

Chiussi, Andrea et al.; Industrial Waste Collection Optimization: A Real-World Case Study in Northern Italy; Springer Nature Switzerland AG; Sep. 2022; pp. 147-161.

Ghazali, M. et al.; Mobile Applicaiton On Garbage Collector Tracker Using Google Maps; Oct. 7, 2019; IEEE 9th International Conference on System Engineering and Technology; pp. 287-291.

Harvey, Mark; Incorporating RFID Technology into Your Waste and Recycling Operations; Waste Advantage Magazine; Oct. 2014: pp. 21-23.

Islam, Shafiqul et al.; Overview for Solid Waste Bin Monitoring and Collection System; International Conference on Innovation Management and Technology Research, May 21, 2012; pp. 258-262; Malaysia.

Karadimas, Dimitris et al.; An integrated node for Smart-City applications based on active RFID tags; Use case on waste-bins; IEEE 21st international conference on emerging technologies and factory automation (ETFA); pp. 1-7; Sep. 6, 2016.

(56) References Cited

OTHER PUBLICATIONS

Kim, Byung-In et al.; Waste Collection Vehicle Routing Problem with Time Windows; Computers and Operations Research; pp. 3624-3642; 2006.
Maia, J. et al.; An IoT Solution for Load Monitoring and Tracking of Garbage-Truck Fleets; IEEE Xplore; 2020; pp. 406-410.
Mojtahedi, Mohammad et al.; Sustainable Vehicle Routing Problem for Coordinated Solid Waste Management; Journal of Industrial Information Integration; Mar. 13, 2021; 23 pages.
Purohit, Suchit et al.; RFID based solid waste collection process; IEEE Recent Advances in Intelligent Computational Systems; pp. 457-460; Sep. 22, 2011.
Putra et al.; Waste Transportation Route Optimization in Malang Using Network Analysis; IOP Conf. Series; Earth and Environmental Science; 2020; 7 pages.
Rabbani, Md. Golam et al.; A Hybrid Metaheuristic Algorithm for Solving a Roll-on Roll-off Waste Collection Vehicle Routing Problem Considering Waste Separation and Recycling Center; International Journal of Applied Operational Research; Apr. 2016; pp. 19-31.
Raucq, Joel et al.; Solving a real-life roll-on-roll-off waste collection problem with column generation; Journal on Vehicle Routing Algorithms; May 10, 2019; 14 pages.
Vishnu, S. et al.; Sensor-Based Solid Waste Handling Systems: A Survey; Sensors 22, No. 6: 2340; Mar. 18, 2022; 19 pages.
Wy, Juyoung et al.; Rollon-Rolloff Vehicle Routing Problem in the Waste Collection Industry; 2010; 6 pages.
Zhang, Hong et al.; Object Tracking for a Smart City Using IoT and Edge Computing; 2019; Sensors; pp. 1-23.
US 9,092,921, 07/2014, Lambert (withdrawn)
A.F., Thompson et al.; Application of Geographic Information System to Solid Waste Management; Pan African International Conference on Information Science, Computing and Telecommunications; 2013; pp. 206-211.
Alfeo, Antonio Luca et al.; Urban Swarms: A new approch for autonomous waste management; Mar. 1, 2019; 8 pages.
Ali, Tariq et al.; IoT-Based Smart Waste Bin Monitoring and Municipal Solid Waste Manaement System for Smart Cities; Arabian Journal for Science and Engineering; Jun. 4, 2020; 14 pages.
Bhargava, Hermant K. et al.; A Web-Based Decision Support System for Waste Disposal and Recycling; pp. 47-65; 1997; Comput. Environ. And Urban Systems, vol. 21, No. 1; Pergamon.
Burnley, S.J. et al.; Assessing the composition of municipal solid waste in Wales; May 2, 2006; pp. 264-283; Elsevier B.V.
Chaudhari, Sangita S. et al.; Solid Waste Collection as a Service using IoT-Solution for Smart Cities; 2018; 5 pages; Publisher: IEEE.
Ferrer, Javier et al.; BIN-CT: Urban Waste Collection Based on Predicting the Container Fill Level; Apr. 23, 2019; 11 pages; Elsevier.
Georgakopoulos, Chris; Cameras Cut Recycling Contamination; The Daily Telegraph; Apr. 7, 2014; 2 pages.
Ghongane, Aishwarya et al; Automatic Garbage Tracking and Collection System; International Journal of Advanced Technology in Engineering and Science; vol. 5, No. 4; Apr. 2017; pp. 166-173.
Greenwalt, Megan; Finnish Company Uses IoT to Digitize Trash Bins; Sep. 14, 2016; 21 pages; www.waste360.com.
Hina, Syeda Mahlaqa; Municipal Solid Waste Collection Route Optimization Using Geospatial Techniques: A Case Study of Two Metropolitan Cities of Pakistan; Feb. 2016; 205 pages; U.S.
Jwad, Zainab Adnan et al.; An Optimization Approach for Waste Collection Routes Based on GIS in Hillah-Iraq; 2018; 4 pages; Publisher: IEEE.
Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.
Karidis, Arlene; Waste Pro to Install Hight-Tech Camera Systems in all Trucks to Address Driver Safety; Mar. 10, 2016; 2 pages; Wastedive.com.
Kontokasta, Constantine E. et al.; Using Machine Learning and Small Area Estimation to Predict Building-Level Municipal Solid Waste Generation in Cities; pp. 151-162; 2018; Computer, Envieonment and Urban Systems; Elsevier.
Lokuliyana, Shashika et al.; Location based garbage management system with IoT for smart city; 13th ICCSE; Aug. 8-11, 2018; pp. 699-703.
Ma, Enlin et al.; Review of Cutting-Edge Sensing Technologies for Urban Underground Construction; Measurement 167; Jan. 2021; pp. 1-16.
Malakahmad, Amirhossein et al.; Solid Waste Collection System in Ipoh City, A Review; 2011 International Conference on Business, Engineering and Industrial Applications; pp. 174-179.
Nilopherjan, N. et al.; Automatic Garbage Volume Estimation Using SIFT Features Through Deep Neural Networks and Poisson Surface Reconstruction; International Journal of Pure and Applied Mathematics; vol. 119, No. 14; 2015; pp. 1101-1107.
Oliveira, Veronica et al.; Journal of Cleaner Production: Artificial Neural Network Modelling of the Amount of Separately-Collected Household Packaging Waste; Nov. 8, 2018; 9 pages; Elsevier.
Product News Network; Telematics/Live Video System Increases Driver Safety/Productivity; Mar. 30, 2015; 3 pages; Thomas Industrial Network, Inc.
Rajani et al.; Waste Management System Based on Location Intelligence; 4 pages; Poojya Doddappa Appa Colleage of Engineering, Kalaburgi; Nov. 16, 2018; 4 pages.
Rich, John I.; Truck Equipment: Creating a Safer Waste Truck Environment; Sep. 2013; pp. 18-20; WasteAdvantage Magainze.
rwp-wasteportal.com; Waste & Recycling Data Portal and Software; 16 pages; printed Oct. 3, 2019.
Sein, Myint Myint et al.; Trip Planning Query Based on Partial Sequenced Route Algorithm; 2019 IEEE 8th Global Conference; pp. 778-779.
Tan, Kah Chun et al.; Smart Land: AI Waste Sorting System; University of Malaya; 2019; 2 pages; Keysight Techonogies.
The Advertiser; Waste Service Drives Innovation; Jan. 25, 2016; 2 pages; Fairfax Media Publications Pty Limited; Australia.
Town of Prosper; News Release: Solid Waste Collection Trucks Equipped wit "Third Eye," video system aborad trash and recycling trucks to improve service; Jan. 13, 2017; 1 page; U.S.
Van Dongen, Matthew; Garbage 'Gotcha' Videos on Rise in City: Residents Irked Over Perceived Infractions; Nov. 18, 2015; 3 pages; The Spectator.
Vu, Hoang Lan et al.; Waste Management: Assessment of Waste Characteristics and Their Impact on GIS Vechicle Collection Route Optimization Using ANN Waste Forecasts; Environmental Systems Engineering; Mar. 22, 2019; 13 pages; Elsevier.
Waste Management Review; A clear vison on waste collections; Dec. 8, 2015; 5 pages; http://wastemanagementreiew.com/au/a-clear-vison-on-waste-collections/.
Waste Management Surveillance Solutiosn; Vehicle Video Cameral; Aug. 23, 2017; 6 pages; http://vehiclevideocameras.com/mobile-video-applications/waste-management-camera.html.
Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).

* cited by examiner

SYSTEM AND METHOD FOR AUTONOMOUS WASTE COLLECTION BY A WASTE SERVICES PROVIDER DURING PERFORMANCE OF A WASTE SERVICE ACTIVITY

1. RELATED APPLICATIONS

This application is a continuation application of, and claims the benefit of, U.S. application Ser. No. 18/130,367, filed Apr. 3, 2023, which claims the benefit, and priority benefit, of U.S. Provisional Patent Application Ser. No. 63/326,708, filed Apr. 1, 2022, the disclosure and contents of which are incorporated by reference herein in their entirety.

2. FIELD OF THE INVENTION

This invention relates generally to autonomous waste and/or recycling collection by a waste services provider during performance of a waste service activity.

3. DESCRIPTION OF THE RELATED ART

It is known in the art to utilize a waste service vehicle to provide services to customers, which can include typical lines of waste industry services such as waste collection and transport and/or recycling for commercial, residential and/or industrial. However, certain existing systems and methods for servicing customers are inefficient, expensive and result in unnecessary delays.

Improvements to this technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a system for improved waste collection in a residential neighborhood is provided. The system can include: a collection station at a centralized location in the neighborhood and configured to receive waste materials; a plurality of autonomous collection vehicles each capable of traveling on a respective travel path between the collection station and one or more residences in the residential neighborhood and configured to collect the waste materials from the residences and deliver the waste materials to the collection station; and a collection vehicle configured to collect the waste materials from the collection station and transport the waste materials away from the neighborhood to a collection site.

In certain aspects, the collection site can be a landfill. The collection station can include a fullness monitor and can be further configured to sort waste materials. The plurality of autonomous collection vehicles can be configured for static routing along the respective travel paths. The plurality of autonomous collection vehicles can be configured for dynamic routing along the respective travel paths. The plurality of autonomous collection vehicles can be configured for either static routing or dynamic routing along the respective travel paths. The configuration of the dynamic routing can be based upon customer collection patterns, customer holiday usage of collection services, load balancing for the autonomous collection vehicle, load balancing for the waste service vehicle, and/or determination of the charge remaining for the autonomous collection vehicles. The plurality of autonomous collection vehicles can be configured to collect waste containers from the residences and deliver the waste containers to the collection station.

In certain aspects, the system can include a communications link between the collection station and the collection vehicle and can be configured such that when the fullness monitor determines that the collection station is filled to a pre-determined level, an instruction is sent to the waste collection vehicle via the communications link to travel to the residential neighborhood to perform waste collections.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates to systems and methods for autonomous waste and/or recycling collection by a waste services provider during performance of a waste service activity. The presently disclosed systems and methods are directed to overcoming the issues and problems of the prior art.

Figure 1:
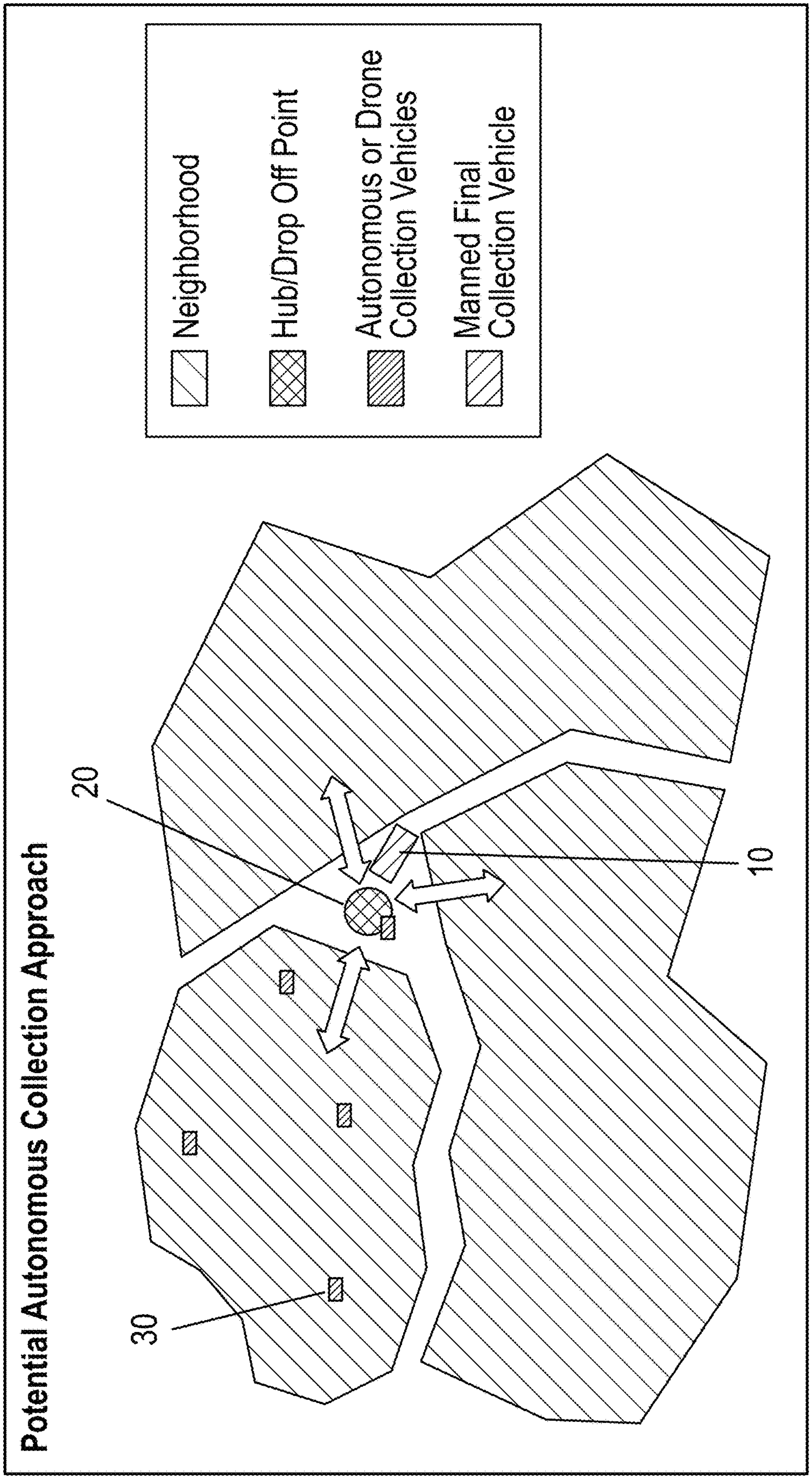
FIG. 1 is an overview of a waste services environment in accordance with an illustrative embodiment of the presently disclosed subject matter.
Figure 2:
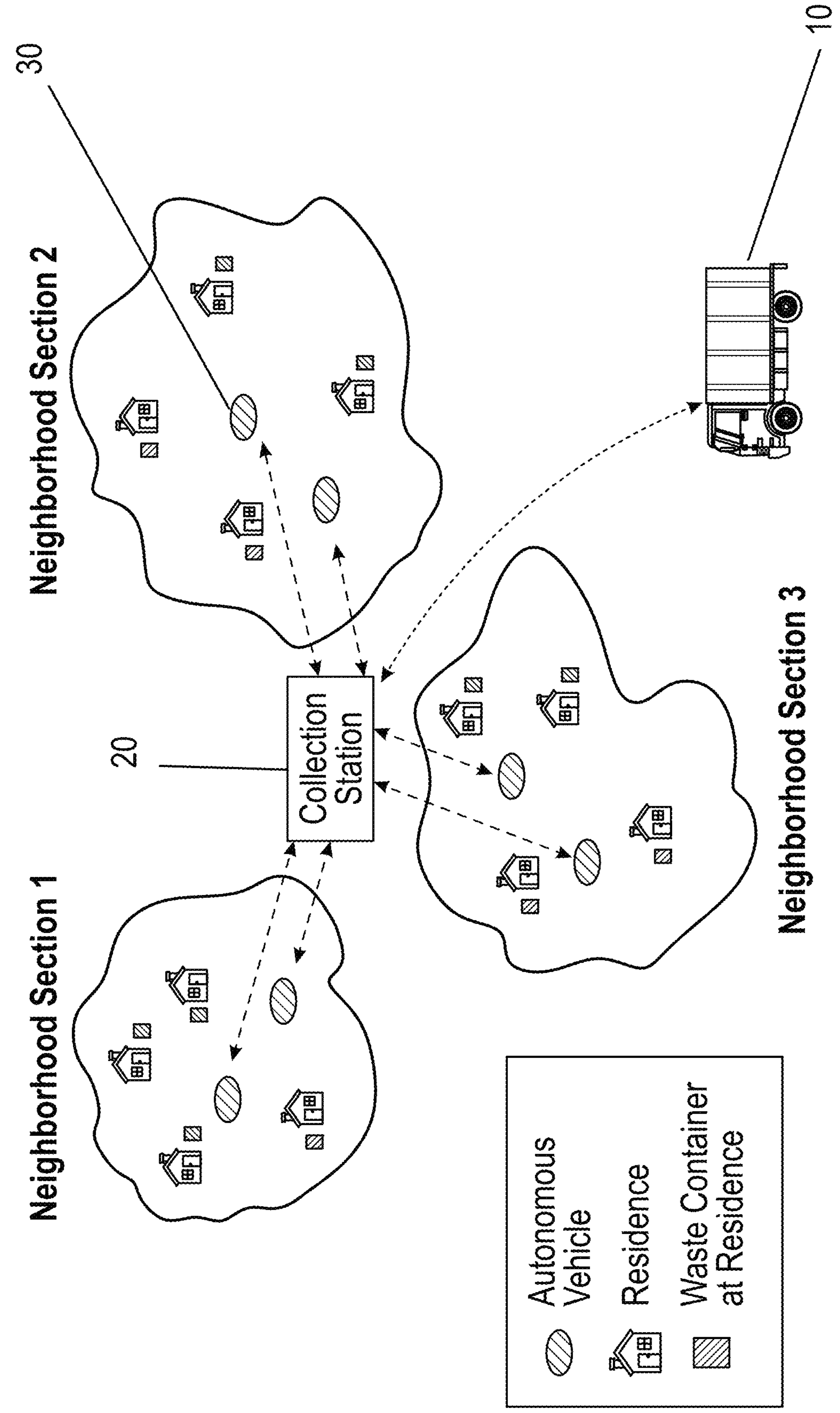
FIG. 2 is an overview of a waste services environment in a residential neighborhood having various parcels or sections in accordance with an illustrative embodiment of the presently disclosed subject matter.

FIG. 1 and FIG. 2 show examples of a waste services environment where the presently disclosed system 5 can be utilized. A waste service vehicle 10 is configured to provide services to customers, which can include typical lines of waste industry services such as waste collection and transport and/or recycling services for commercial, residential and/or industrial. In certain illustrative embodiments, waste service vehicle 10 can include manned, autonomous, drone, etc . . . .

In the particular illustrative embodiment of FIG. 2, the waste services environment is a residential neighborhood having various parcels or sections, although it is contemplated that the presently disclosed system and method can be utilized in other waste services environments such as commercial or industrial as well. Also, the neighborhood can comprise multiple neighborhoods that are adjacent to each other.

In certain illustrative embodiments, the system 5 can include, without limitation: (i) a collection station 20 or "hub" at a centralized location in a residential neighborhood or group of neighborhoods; (ii) a plurality of autonomous collection vehicles 30 capable of traveling between the collection station 20 and the residences in the neighborhood to collect waste/items, recyclables and/or containers at the residences and deliver the waste/items, recyclables and/or containers to the collection station 20; and (iii) a waste service vehicle 10 capable of collecting waste/items from the collection station 20 and transporting the waste/items away from the neighborhood to a landfill or other collection, disposal or processing site.

As used throughout this document, the terms "residential" or "neighborhood" or the phrase "residential neighborhood," or any other like terms or phrases, are used for explanatory purposes only and should not be seem as limiting, as the presently disclosed subject matter may be utilized in a residential, urban, industrial, commercial, mixed-use, apartments or condo, single-family or any other type of setting where waste or recycling services may be offered to customers.

Figure 3A:
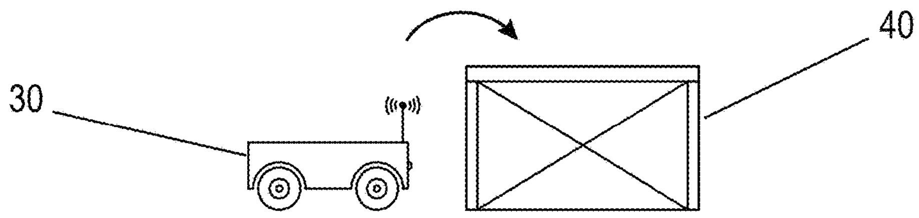
FIG. 3A is a side view of a collection station or "hub" for storing waste and/or recyclables that have been collected from a neighborhood in accordance with an illustrative embodiment of the presently disclosed subject matter.
Figure 3B:
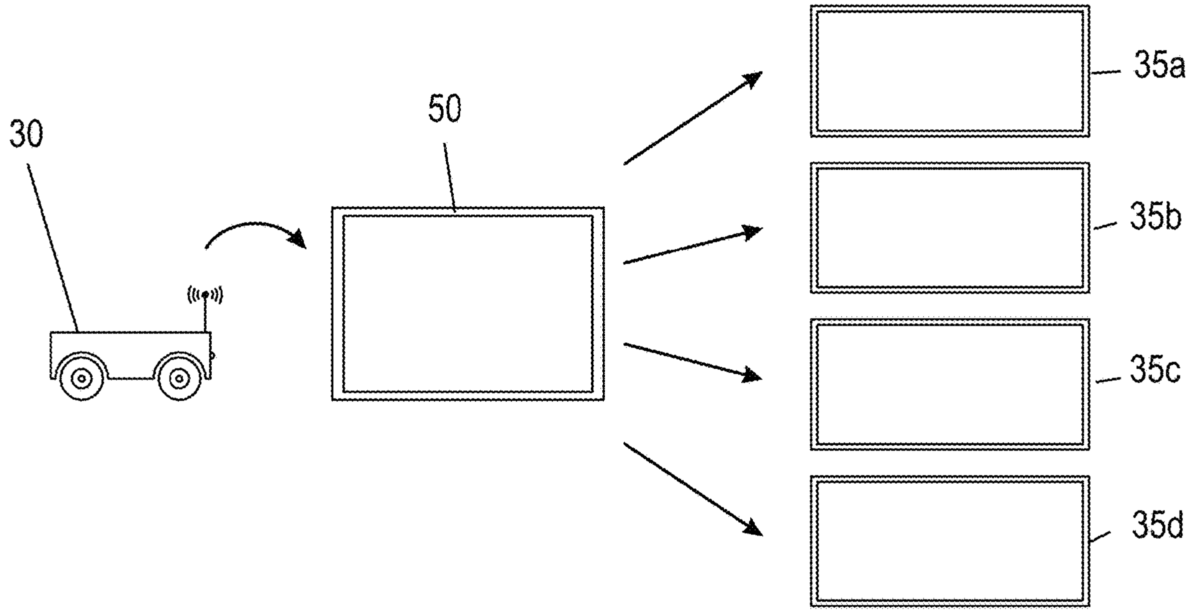
FIG. 3B is a side view of a sorting station for sorting waste and/or recyclables that have been collected from a neighborhood in accordance with an illustrative embodiment of the presently disclosed subject matter.
Figure 3C:
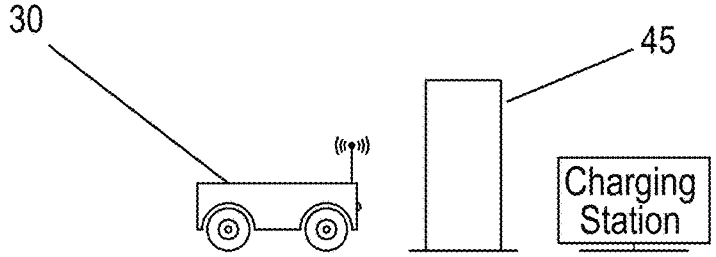
FIG. 3C is a side view of a charging station for charging an autonomous collection vehicle in accordance with an illustrative embodiment of the presently disclosed subject matter.

In certain illustrative embodiments, the system 5 can include a collection station 20 or "hub" for storing waste and/or recyclables that have been collected from the neighborhood. The collection station 20 or "hub" can have a variety of different forms. For example, as shown in FIG. 3A, the collection station 20 or "hub" can include a compactor 40 that is capable of compacting the various source-separated waste items received from the plurality of autonomous collection vehicles 30. As shown in FIG. 3B, the collection station 20 or "hub" can include a sorter 50 that functions as a processing facility and is configured to separate the collected waste received from the plurality of autonomous collection vehicles 30 into various constituent components such as MSW, plastics, paper, organics, yard waste, recyclables, etc. and deposit the separated materials into associated containers 35*a*, 35*b*, 35*c* 35*d*, etc. In certain illustrative embodiments, the collection station 20 can also include a fullness or capacity monitor 60 for determining the weight and/or amount of waste that has been collected and/or is being stored (e.g., 65% of container capacity), as well as one or more optical sensors 70 such as cameras or scanners that can be utilized together with computer auditing software and/or human auditors at a remote location to identify the material contents of the waste that has been collected. The collection station 20 or "hub" would preferably be positioned at a centralized location in the neighborhood that is accessible by as many neighborhood residences as possible. As shown in FIG. 3C, the plurality of autonomous collection vehicles 30 can be charged at one or more charging stations 45 located at or near the collection station 20, or alternatively, can be charged wirelessly.

In certain illustrative embodiments, the collection station 20 or "hub" can include equipment and related software for processing and identifying collected material to provide sustainability related performance to customers.

In certain illustrative embodiments, the system 5 can also include a plurality of autonomous collection vehicles 30. The autonomous collection vehicles 30 are configured for travelling between the collection station 20 and the residences in the neighborhood to collect waste/items and/or waste/item containers at the residences and deliver the waste/items and/or waste/item containers to the collection station 20. The collection station 20 can function as a home base, or "hub," for the autonomous collection vehicles 30. The containers will typically be assigned to, or associated with, specific customers at specific residential addresses registered to a waste collection company.

Figure 4A:
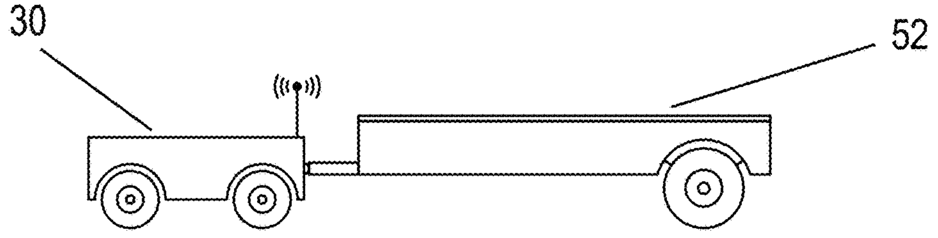
FIG. 4A is a side view of an autonomous land-based collection vehicle with a trailer in accordance with an illustrative embodiment of the presently disclosed subject matter.
Figure 4B:
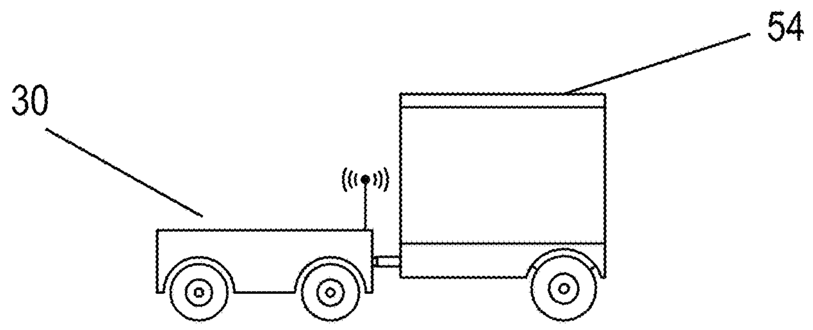
FIG. 4B is a side view of an autonomous land-based collection vehicle with a hopper in accordance with an illustrative embodiment of the presently disclosed subject matter.
Figure 4C:
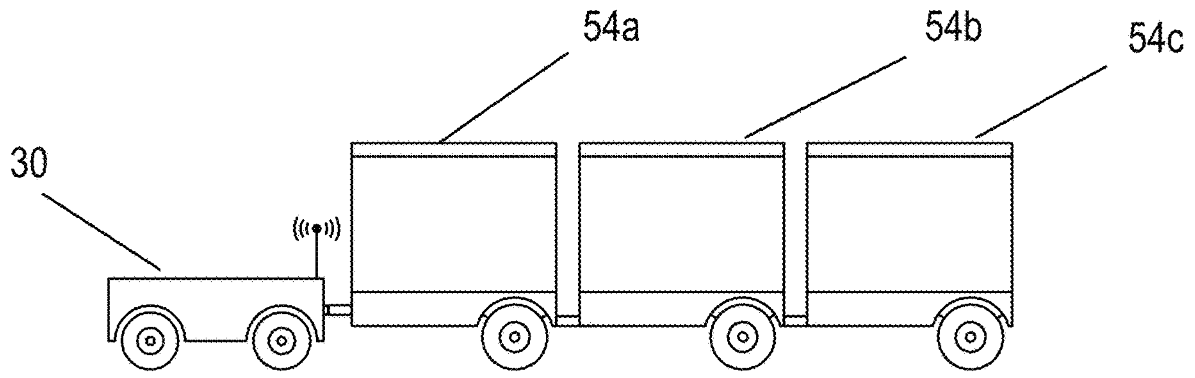
FIG. 4C is a side view of an autonomous land-based collection vehicle with a series of consecutive hoppers in accordance with an illustrative embodiment of the presently disclosed subject matter.

The autonomous collection vehicles 30 can have a variety of different forms. For example, as shown in FIGS. 4A-C, the autonomous collection vehicles 30 can be land-based vehicles that travel on the roads, streets and/or designated pathways in the residential neighborhood. The land-based vehicles can include a trailer 52 (for, e.g., empty return or swap out) (see FIG. 4A), a hopper or mini hopper 54 (see FIG. 4B), a train of consecutive hoppers 54*a*, 54*b*, 54*c* (e.g., tug and pull) (see FIG. 4C), or any other orientation that is beneficial for carrying collected waste. Alternatively, the autonomous collection vehicles 30 can be aircraft such as drones, etc. with similar waste storage means and capability.

In certain illustrative embodiments, the autonomous collection vehicles 30 can be electrically powered vehicles with zero/ultra-low emissions, and capable of receiving a charge to power up. As shown in FIG. 3C, one or more charging stations 80 can be located on or near the collection station 20 that are compatible with the autonomous collection vehicles 30 and capable of providing charging to said vehicles 30. Alternative, the waste collection vehicles 10 can be vehicles with traditional internal combustion engines (ICE).

In certain illustrative embodiments, a set of programmed data can be associated with the routing for the autonomous collection vehicles 30. The set of programmed data can include, for example, customer-related data pertaining to a plurality of customer accounts. Such information may include customer location, route data, container weight, items expected to be removed from the customer site, billing data, and/or location information (e.g., street address, city, state, and zip code) of a customer site.

In certain illustrative embodiments, the programmed data can be utilized to develop "static" or "dynamic" routing for the autonomous collection vehicles 30.

In the context of "static" routing, the autonomous collection vehicles 30 can travel along a fixed, predefined path and have a set collection schedule and practice (e.g., pick-up of container waste from the same residence at the same address every Tuesday at 11 am).

In the context of "dynamic" routing, software algorithms and machine learning can be utilized to change or alter the path, schedule and/or practice of the autonomous collection vehicles 30 according to various factors. For example, machine learning can be utilized to "intelligently" alter the collection path, schedule and/or practice based on one or more factors associated with, e.g., customer activity such as, without limitation, collection patterns, holiday usage, different customer schedules (e.g., on call, on vacation, etc . . . ), frequent users, overloaded containers, weight and/or load balancing for autonomous collection vehicles 30 and/or the waste service vehicle 10, charge remaining for autonomous collection vehicles 30, etc.

Figure 5:
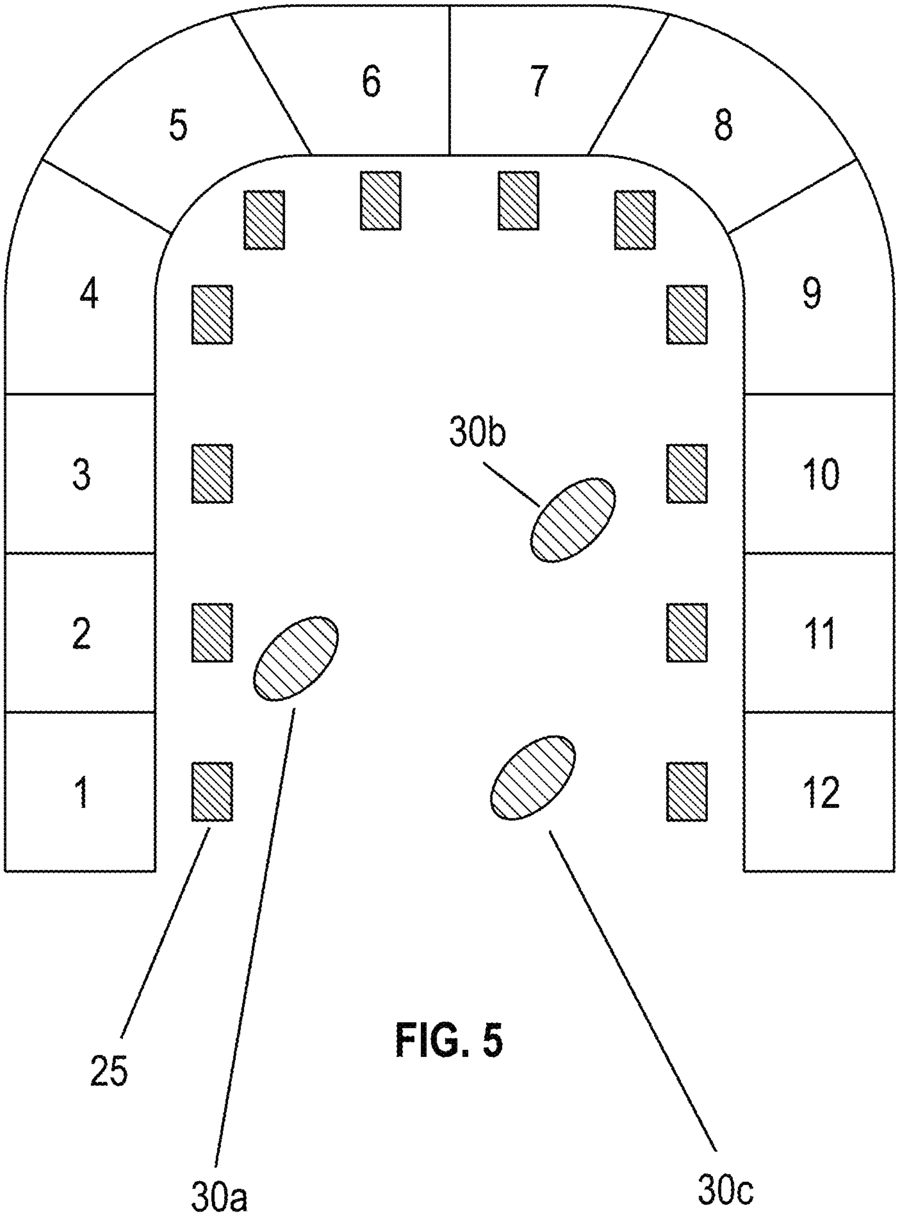
FIG. 5 is aa overview of a waste services environment where static and/or dynamic routing is utilized in accordance with an illustrative embodiment of the presently disclosed subject matter.

By way of example, as shown in FIG. 5, static and/or dynamic routing can be utilized in a particular section of a residential neighborhood. On a residential street with residences at 1, 2, 3, 4, 5, etc., each residence having items or containers 25 (e.g., waste containers), the autonomous collection vehicles 30A, 30B, 30C can be capable of providing collection services for customers. For static routing, a first route sequence might be: (i) 30A collects from residences 1, 2,3; (ii) 30B collects from residences 4, 5, 6; and (iii) 30C collects from residences 7, 8, 9. However, the instructions can change ("dynamic routing") so that the routing of the autonomous collection vehicles 30 is changed to: (i) 30A collects from residences 1, 2, 3, 4, 5; (ii) 30B collects from residences 6, 7; and (iii) 30C collects from residences 8, 9, 10.

In certain illustrative embodiments, the system 5 can also include a waste service vehicle 10 capable of collecting waste/items from the collection station 20 and transporting the waste/items away from the neighborhood and to a landfill or other collection area that is off-site and remote from the neighborhood. Some examples of types of waste service vehicle 10 can include, for example, trucks such as front loader and rear loaders for commercial lines of business, automated side loaders and rear loaders for residential lines of business, and/or vehicles typically utilized for industrial lines of business. Typically, automated side loaders in residential lines of business perform service only on one side of the street (nearest the right side of the vehicle), while rear loaders can perform service on both sides of the street (right and left). All these vehicles 30 can also be equipped with onboard computer units (OBU) 90 that enable driver interactions with the OBU 90 and capturing of GPS location data and events corresponding to a service.

In certain illustrative embodiments, a communications network 100 may be adapted for use in the specific waste services environment of FIG. 1 and FIG. 2. For example, the system 5 can include a communications link between the collection station 20 and the waste service vehicle 10, such that when the fullness or capacity monitor 60 indicates that the collection station 20 is filled to a certain level, the waste service vehicle 10 will travel to the neighborhood to perform waste collections. There could also be communications links between the other system elements as well, such as between any of the waste service vehicle 10, the containers, the collection station 20, the autonomous collection vehicles 30, the customer residences, and/or an off-site monitoring station 110 operated by the waste service provider.

The communications network 100 can include a plurality of data sources and a central server. Data sources may be, for example, devices configured for capturing and communicating operational data indicative of one or more operational characteristics of the system components (e.g., optical sensors such as cameras, scanners, RFID tags, bar codes, user input received via a user interface provided on a mobile phone, local or remote computer, etc . . . ). Data sources are configured to communicate with a central server by sending and receiving operational data over a network (e.g., the Internet, an Intranet, or other suitable network).

In certain illustrative embodiments, system 5 is configured to pick up waste autonomously in sequence, and not on demand or by capacity. Moreover, in certain illustrative embodiments, the system 5 is configured to capture real time data for the autonomous collection vehicles 30 and the communication system and network 100 will help the user to route-optimize based on GPS coordinates and real time data.

In certain illustrative embodiments, the central server can be a local central server configured to process and evaluate the operational data received from data sources.

Communications devices can be disposed on the system components. The communications devices and local central server are configured to communicate with each other via a communications network (e.g., the Internet, an Intranet, a cellular network, or other suitable network). In addition, communications device and central server are configured for storing data to an accessible central server database located on, or remotely from, the local central server. In the description provided herein, the system 5 may be configured for managing and evaluating the operation of a large fleet of waste service vehicles 10 and autonomous collections vehicles 30. As such, in certain illustrative embodiments, the system 5 may further comprise a plurality of communications devices 120, each being associated with one of a plurality of waste service vehicles 10 or autonomous collections vehicles 30.

In certain illustrative embodiments, the communication between the communications devices 120 and the local and/or remote central server may be provided on a real time basis such that during the collection route, data is transmitted from each waste service vehicle 10 or autonomous collection vehicle 30 to the desired central server. Alternatively, communication device 120 may be configured to temporarily store or cache data during the collection route and transfer the data to the desired central server on, e.g., return of the waste service vehicle 10 to the location of the waste collection company or when the autonomous collection vehicle 30 docks with the collection station 20 or "hub."

In certain illustrative embodiments, waste service vehicle 10 can also include an onboard computer 130 and a location device 140. Onboard computer 130 can be, for example, a standard desktop or laptop personal computer ("PC"), or a computing apparatus that is physically integrated with vehicle 30, and can include and/or utilize various standard interfaces that can be used to communicate with the location device 140. Onboard computer 130 can also communicate with central server via a communications network via the communication device 120. The location device 140 can be configured to determine the location of the waste service vehicle 10 always while the waste service vehicle 10 is inactive, in motion and operating and performing service related and nonservice related activities. For example, location device 140 can be a GPS device that can communicate with the waste collection company. A satellite or other communications device 150 can be utilized to faciliate communications. For example, location device 140 can transmit location information, such as digital latitude and longitude, to onboard computer 130 via satellite. Thus, location device can identify the location of the waste service vehicle 10 at all times it is in operation.

Similarly, the autonomous collection vehicle 30 can include an onboard computer 150 and a location device 160. Onboard computer 150 can be, for example, a standard desktop or laptop personal computer ("PC"), or a computing apparatus that is physically integrated with vehicle, and can include and/or utilize various standard interfaces that can be used to communicate with the location device 160. Onboard computer 150 can also communicate with central server via a communications network via the communication device. The location device 160 can be configured to determine the location of the autonomous collection vehicle 30 always while the autonomous collection vehicle 30 is inactive, in motion and operating and performing service related and nonservice related activities. For example, location device 160 can be a GPS device that can communicate with the waste collection company. A satellite or other communications device can be utilized to facilitate communications. For example, location device 160 can transmit location information, such as digital latitude and longitude, to onboard computer 150 via satellite. Thus, location device 160 can identify the location of the autonomous collection vehicles 30 at all times.

In certain illustrative embodiments, central server can be configured to receive and store operational data (e.g., data received from waste services vehicle 10 or the autonomous collection vehicle 30) and evaluate the data to aid waste services company in improving operational efficiency. Central server can include various means for performing one or more functions in accordance with embodiments of the present invention, including those more particularly shown and described herein; however, central server may include alternative devices for performing one or more like functions without departing from the spirit and scope of the present invention.

In certain illustrative embodiments, central server can include standard components such as processor and user interface for inputting and displaying data, such as a keyboard and mouse or a touch screen, associated with a standard laptop or desktop computer. Central server also includes a communication device for wireless communication with onboard computer.

Central server may include software that communicates with one or more memory storage areas. Memory storage areas can be, for example, multiple data repositories which stores pre-recorded data pertaining to a plurality of customer accounts. Such information may include programmed data such as customer-related data pertaining to customer location, route data, items expected to be removed from the customer site, billing data, and/or location information (e.g., street address, city, state, and zip code) of a customer site. Using the location information for a customer site, software may find the corresponding customer account in memory storage areas. Database for data storage can be in memory storage area and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, the presently disclosed systems and methods for autonomous waste and/or recycling collection by a waste services provider during performance of a waste service activity can utilize functionality and improvements to proprietary systems such as described in U.S. Pat. No. 10,594,991 issued Mar. 17, 2020, and assigned to WM Intellectual Property Holdings LLC and titled "System and method for managing service and non-service related activities associated with a waste collection, disposal and/or recycling vehicle," the disclosure and contents of which are incorporated by reference herein in their entirety.

In certain illustrative embodiments, a system for improved waste collection or collection of items in a residential neighborhood is provided. The system can include: a collection station 20 or "hub" at a centralized location in the neighborhood, the collection station 20 having a fullness or capacity monitor and materials sorting capability; a plurality of autonomous collection vehicles 30 each capable of traveling on a respective travel path between the collection station 20 and the residences in the neighborhood to collect waste/items and/or waste/item containers at the residences and deliver the waste/items and/or waste/item containers to the collection station 20, wherein the plurality of autonomous collection vehicles 30 are configured for static and/or dynamic routing along the respective travel paths; a (waste) collection vehicle 10 capable of collecting waste/items from the collection station 20 and transporting the waste/items away from the neighborhood to a landfill or other collection site; and a communications link between the collection station 20 and the (waste) collection vehicle 10, such that when the fullness or capacity monitor indicates that the collection station 20 is filled to a certain level, the waste collection vehicle 10 will travel to the neighborhood to perform waste collections. In certain aspects: the neighborhood can include multiple adjacent/connected neighborhoods put together that will have autonomous collection vehicles 30 and collection stations 20; the autonomous collection vehicles 30 can include electric autonomous vehicles; the waste can include municipal solid waste (MSW), recyclables, organics, yard waste, and other deposited items; the collection site can include the "hub," wherein the autonomous vehicle 30 can deliver the waste to the hub 20, and another vehicle which could be autonomous would then pick up the waste from the hub 20 to deliver it to a transfer station or landfill; the waste collection can be performed based on frequency such as once a week or twice a week regardless of fullness capacity; and/or the communication link can also be at the hub 20, and can notify a user that the hub 20 is full and a transportation vehicle can come and pick up the hub 20 and then bring that to a landfill or transfer station.

In certain illustrative embodiments, a customer facing portal 180 can be provided that allows customers to check items such as service status, sustainability data, billing etc. in connection with the presently disclosed system and method.

In certain illustrative embodiments, one or more action proposals can be generated based on information gathered by the waste service vehicle 10 and/or autonomous collection vehicle 30 during the waste service activity. The actions proposals can include, for example, recommendations to (i) remove excess waste from customer container, (ii) remove and replace container, (iii) provide additional containers, (iv) provide reporting, education and/or instructions to customer, or (v) to adjust customer billing.

In addition, historical account information and attributes of target customer and "like" customers can be collected, and the action proposals for target customers can be determined and ranked based on lifetime value impact scoring. Additional information can also be collected from the Internet or other outside sources. Scoring of target customer can be impacted based on prior proposals or interactions as well as preferences/acceptances of "like" customers to similar action proposals, and restrictions or constraints from target customer's attributes can be applied. Action proposals can be delivered to appropriate user/system for acceptance, and thereupon, the action proposal can be executed/applied, which can include charging the customer for the overage, notifying the customer of the overage through a proactive warning and notification process (including still images and/or video), and noting the overage incident on the customer's account.

In certain illustrative embodiments, a method is provided for collecting, processing, and applying data from a waste service vehicle 10 and/or autonomous collection vehicle 30 to increase customer lifetime value through targeted action proposals. The method can include the steps of: collecting information (such as image, video, collection vehicle, driver inputs) at a target service location; matching customer account to a target service location; processing information from the target service location and historical customer account record to create an action proposal; and executing an action from the action proposal. The information that can be processed can include a variety of gathered information from the waste service vehicle 10 and/or autonomous collection vehicle 30 and/or from other sources relating to the residential neighborhood and collections performed therein or therefor using the autonomous collection vehicles 30, for example, information regarding safety, receptacle condition, receptacle contents, fill status and/or contamination status, site conditions, obstructions (temporary or permanent), service, service quality (verification, receptacle identification, receptacle contents), service audit (size, frequency, location, and quantity), service exceptions (unable to service, site obstructions), site damage, theft/poaching/no customer, sustainability, material diversion/audits, dangerous/hazardous materials, savings, site service times, bin locations and ancillary services (locks, gates, etc).

In certain illustrative embodiments, machine learning workflows can also be utilized to augment the information gathered by the waste service vehicle 10 and/or autonomous collection vehicles 30. In certain illustrative embodiments, machine learning workflows can process commercial and/or residential overage and contamination events. An object detection model can support the overage and contamination workflows with contamination using an additional classification layer. Object detection can be utilized to identify objects of certain classes in an image, interpreting these images and make predictions. Capture of potentially millions of images and videos is possible using optical sensors, however, relevant metadata to help facilitate the creation of training datasets for machine learning can be limited. In certain illustrative embodiments, data can be curated and labeled for these specific purposes.

The presently disclosed subject matter has a variety of practical applications, as well as provides solutions to a number of technological and business problems of the prior art. For example, the presently disclosed waste management system can allow a waste service provider to more efficiently access and service customer waste containers during performance of a waste service activity. The presently disclosed waste management system can also provide improved sorting and material recovery, disposal load maximization, dynamic service schedules and other improved collection activities.

In certain illustrative embodiments, the system and method disclosed herein can also be utilized to perform collection or related services in industries other than the waste/recycling industry where automation, intelligent routing and associated computer functionality are utilized, such as, for example, package delivery, logistics, transportation, food delivery, ride hailing, couriers, freight transportation, etc.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Cloud storage can also be used. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

It is to be understood that the present invention is not limited to the embodiment(s) described above and illustrated herein, but encompasses any and all variations falling within the scope of the appended claims.

What is claimed is:

1. A system for improved waste collection in a residential neighborhood, comprising:
- a collection station comprising a plurality of docks configured to receive a respective autonomous vehicle, the collecting station positioned proximate to the residential neighborhood;
- the plurality of autonomous vehicles comprising a respective onboard computing system configured to receive and cause execution of waste collection operations and a respective sensing system comprising a camera, each autonomous vehicle configured to:
  - travel along a respective travel path between the collection station and a waste container;
  - collect waste materials from the waste container; and
  - deliver the waste materials to the collection station;

one or more charging stations that are compatible with the autonomous vehicles and capable of providing charging to the autonomous vehicles; and a server configured to send instructions each respective onboard computing system including the travel path.

2. The system of claim 1, when the plurality of autonomous vehicles is configured to collect waste containers from one or more residences and deliver the waste containers to the collection station.

3. The system of claim 1, wherein:

the collection station comprises a sensor configured to detect a fullness level of the collection station; and in response to detecting that the fullness level satisfies a fullness criteria, send instructions comprising a waste collection request.

4. The system of claim 3, comprising:

a collection vehicle configured to collect waste material from the collection station, the collection vehicle configured to receive the instructions from the collection station.

5. The system of claim 1, wherein:

the plurality of autonomous vehicles comprise a respective electric motor;

each respective onboard computing system is configured to:

detect a charge level of a battery associated with the respective electric motor;

in response to the charge level failing a charge level criteria:

compute a remaining travel time on the charge level;

identify a customer bin that is within the remaining travel time; and modify a travel path to service the customer bin.

6. The system of claim 5, wherein:

subsequent to servicing the customer waste container by a particular autonomous vehicle having a particular charge level failing the charge level criteria, automatically coupling to the one or more charging stations.

7. The system of claim 1, wherein the collection station comprises:

a waste compactor configured to receive waste from the plurality of autonomous vehicles.

8. The system of claim 1, wherein the collection station comprises:

a sorting station having a plurality of sorting bins comprising optical sensors, the sorting station configured to receive waste from the plurality of autonomous vehicles and separate the waste according to a sorting criteria into the plurality of sorting bins.

9. An autonomous waste collection system comprising:

a plurality of autonomous waste vehicles, each autonomous waste vehicle individually controllable to navigate from an origin to a customer waste bin located proximate to a parcel associated with the customer, each autonomous waste vehicle comprising:

a GPS system;

a sensor system; and an onboard computer system communicably coupled to the GPS system and the sensor system and configured to define a travel path along which each autonomous waste vehicle is configured to travel;

a collection station defining the origin of the plurality of autonomous waste vehicles, the collection station configured to receive and store waste collected by each autonomous vehicle from the plurality of autonomous vehicles.

10. The autonomous waste collection system of claim 9, wherein the customer waste bin is a residential waste bin.

11. The autonomous waste collection system of claim 9, wherein the sensor system comprises optical sensors.

12. The autonomous waste collection system of claim 9, wherein the plurality of autonomous waste vehicles are configured to pick up container waste at a predefined schedule.

13. The autonomous waste collection system of claim 9, wherein the system comprises a machine learning engine configured to output a change to a respective travel path for the plurality of autonomous vehicle, the change based on at least one of holiday usage, overloaded containers, or load balancing.

14. The autonomous waste collection system of claim 9, wherein each autonomous waste vehicle of the plurality of autonomous waste vehicles are configured as land-based vehicles for road traveling.

15. The autonomous waste collection system of claim 14, wherein each autonomous waste collection vehicle of the plurality of autonomous waste collection vehicles includes a hopper configured to carry collected waste from the customer waste bin.

16. A method for collecting residential waste, the method comprising:

positioning, at a location proximate to a residential neighborhood, a collection station, the collection station comprising:

a hopper configured to receive residential waste; and a charging dock;

deploying an autonomous vehicle operable to travel from the collection station to a residential parcel comprising a customer waste bin, the autonomous vehicle comprising:

a battery configured to be charged at the charging dock;

a sensor system;

a GPS system; and an onboard computer configured to receive data from the sensor system and the GPS system and cause the autonomous vehicle to travel along a travel path defined by a machine learning model;

traversing, by the autonomous vehicle, a travel path to a customer waste bin;

collecting, by the autonomous vehicle, waste associated with the customer waste bin; and conveying, by the autonomous vehicle, the waste to the collection station.

17. The method of claim 16, comprising:

determining the travel path, by the machine learning model, based on a current charge level associated with the battery.

18. The method of claim 16, comprising:

detecting, by the collection station, that a fullness level of the hopper satisfies a criteria; and in response to the fullness level satisfying the criteria, instructing a waste service vehicle to collect waste from the collection station.

19. The method of claim 16, wherein the collecting waste associated with the customer waste bin comprises collecting the customer waste bin and conveying the customer waste bin to the collection station.

20. The method of claim 16, wherein the autonomous vehicle is one of a plurality of autonomous vehicles.

21. A system for improved waste collection in a residential neighborhood, the system comprising:

a collection station positionable proximate to the residential neighborhood and comprising a hopper configured to receive residential waste;

an autonomous vehicle configured to navigate along a travel path and collect residential waste from a parcel associated with a customer; and a machine learning system configured to dynamically generate the travel path executable by the autonomous vehicle, the travel path based on:

a GPS location from the autonomous vehicle;

a charge level of the autonomous vehicle; and one or more sensor data.

22. The system of claim 21, wherein the collection station further comprises:

a charging station configured to charge a battery of the autonomous vehicle; and a compactor configured to compact waste.

23. The system of claim 22, wherein the autonomous vehicle comprises a train of consecutive hoppers configured to collect waste from a plurality of parcels.

24. The system of claim 23, wherein the autonomous vehicle is configured as a drone.

25. The system of claim 21, comprising a waste collection vehicle operable to collect waste materials from the collection station and transport the materials to a collection site away from the residential neighborhood.

26. An autonomous waste collection system comprising:

a plurality of autonomous waste vehicles, each autonomous waste vehicle individually controllable to navigate from an origin to a customer waste bin located proximate to a parcel associated with the customer, each autonomous waste vehicle comprising:

a battery;

a GPS system; and an onboard computer system configured to execute navigation instructions of the plurality of autonomous vehicles using data from the GPS system;

a server configured to instantiate an instance of a machine learning model configured to alter a travel path of the plurality of autonomous waste vehicles based on a charge remaining the battery of the plurality of autonomous vehicles; and a collection station defining the origin of the plurality of autonomous waste vehicles, the collection station configured to receive and store waste collected by each autonomous vehicle from the plurality of autonomous vehicles.

27. The autonomous waste collection system of claim 26, wherein the machine learning model is configured to alter the travel path based on a current position for at least one autonomous vehicle or the plurality of autonomous vehicle transmitted by the GPS system.

28. The autonomous waste collection system of claim 26, wherein the collection station comprises a wireless charging station configured to charge the battery of an autonomous waste vehicle from the plurality of autonomous waste vehicles.

29. The autonomous waste collection system of claim 26, wherein each autonomous vehicle of the plurality of autonomous vehicles comprise a respective sensor system having optical sensors configured to capture a plurality of images.

30. The autonomous waste collection system of claim 26, wherein the plurality of autonomous waste vehicles are configured to pick up container waste at a predefined schedule.

31. The autonomous waste collection system of claim 26, wherein the machine learning model is configured to alter the travel path based on at least one of holiday usage, overloaded containers, or load balancing.

32. The autonomous waste collection system of claim 26, wherein each autonomous waste vehicle of the plurality of autonomous waste vehicles are configured as land-based vehicles for road traveling.

33. The autonomous waste collection system of claim 32, wherein each autonomous waste collection vehicle of the plurality of autonomous waste collection vehicles includes a hopper configured to carry collected waste from the customer waste bin.

34. A method for collecting residential waste, the method comprising:

positioning, at a location proximate to a residential neighborhood, a collection station, the collection station comprising:

a hopper configured to receive residential waste; and a charging dock;

generating, by a machine learning model, a first travel path based on a location from the collection station to a plurality of residences having a respective customer container;

deploying an autonomous vehicle operable to travel along the first travel path, the autonomous vehicle comprising:

a battery configured to be charged at the charging dock; and a GPS system; and traversing, by the autonomous vehicle, at least a portion of the first travel path;

generating, by the machine learning model, a second travel path based on a charge remaining associated with the battery;

traversing, by autonomous vehicle, at least a portion of the second path;

collecting, by the autonomous vehicle, waste associated with the customer container; and conveying, by the autonomous vehicle, the waste to the collection station.

35. The method of claim 34, wherein the first travel path is longer than the second travel path.

36. The method of claim 34, comprising:

detecting, by the collection station, that a fullness level of the hopper satisfies a criteria; and in response to the fullness level satisfying the criteria, instructing a waste service vehicle to collect waste from the collection station.

37. The method of claim 34, wherein the collecting waste associated with the customer waste bin comprises collecting the customer waste bin and conveying the customer waste bin to the collection station.

38. The method of claim 34, wherein the autonomous vehicle is one of a plurality of autonomous vehicles.

* * * * *